July 19, 1960 D. E. MacLEOD 2,945,357
PORTABLE AIR CONDITIONING UNITS
Filed Sept. 22, 1958 3 Sheets-Sheet 1

INVENTOR.
David Earle MacLeod
BY
Herman Seid
atty.

July 19, 1960 D. E. MacLEOD 2,945,357
PORTABLE AIR CONDITIONING UNITS
Filed Sept. 22, 1958 3 Sheets-Sheet 2
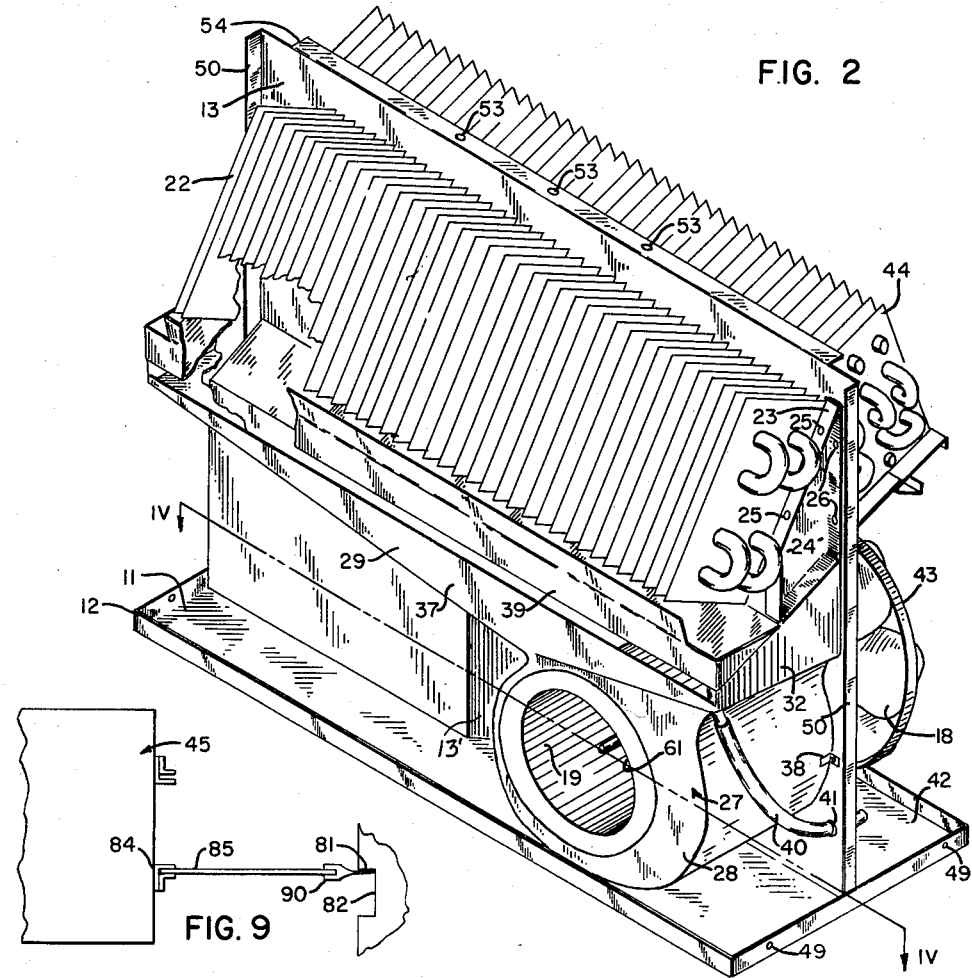
FIG. 2
FIG. 9
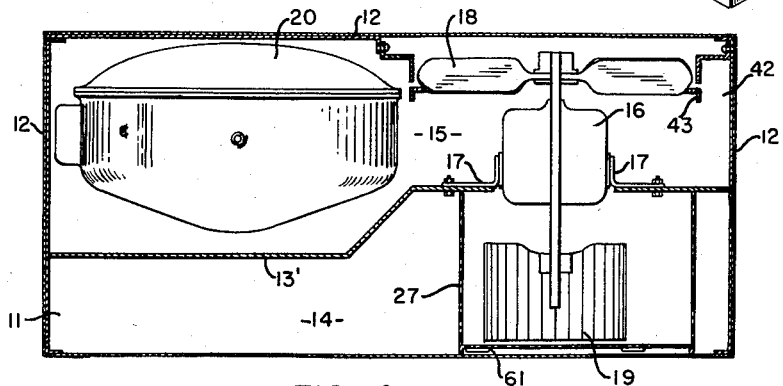
FIG. 4
INVENTOR.
David Earle MacLeod
BY Herman Seid
atty.

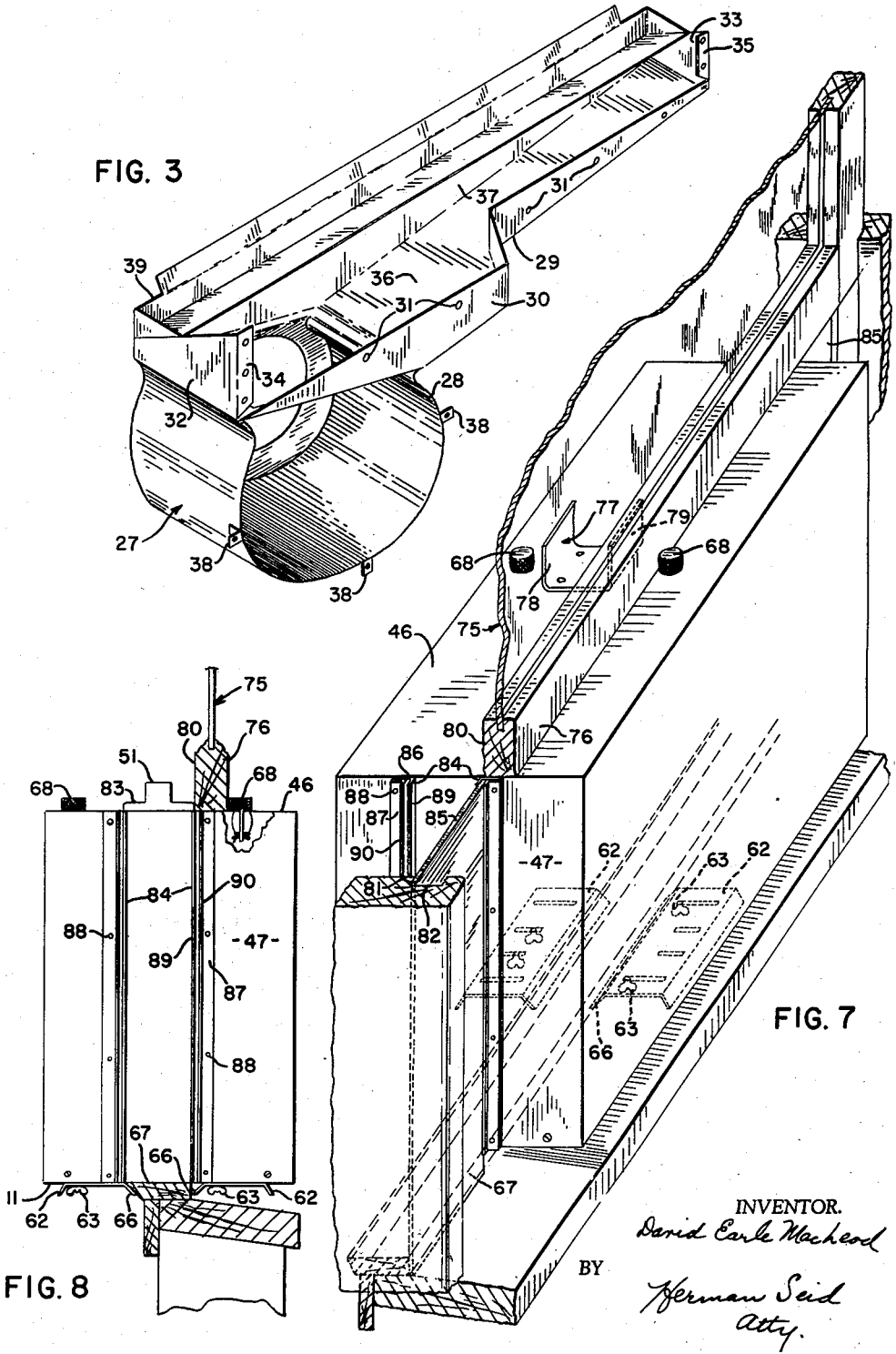

United States Patent Office 2,945,357
Patented July 19, 1960

2,945,357

PORTABLE AIR CONDITIONING UNITS

David Earle MacLeod, Syracuse, N.Y., assignor to Carrier Corporation, Syracuse, N.Y., a corporation of Delaware Filed Sept. 22, 1958, Ser. No. 762,316

14 Claims. (Cl. 62—262)

This invention relates to air conditioning, more particularly, to a portable air conditioning unit which may readily be moved, as desired, and may be installed in a variety of locations and orientations to provide either cooling or heating, as well as being capable of use as a dehumidifier.

Conventional air conditioning units comprise a compression refrigeration system including a heat dissipating condenser, a heat absorbing evaporator, and a compressor, all arranged in a fluid circuit through which refrigerant is circulated. These conventional air conditioners have in the past been adapted for installation in the windows of a conditioned area with their cooling coils in heat exchange relationship with the air in the area. Such units have been relatively heavy and cumbersome, requiring the services of skilled mechanics for their installation, an installation which is substantially fixture-like. Since most air conditioning units of the aforementioned window type are employed for air conditioning of residences, considerable economies could be effected if the unit could be employed to service family living areas during the day time and sleeping areas during the night. Additionally the conventional unit as installed is limited to providing cooling. Since each unit contains a heat dissipating condenser, it would be desirable to be able to employ same for heating, and dehumidifying as well as cooling. Due to the cumbersome nature of the conventional unit and the skills required for its proper installation, these desiderata have been heretofore unattainable.

Attempts have been made to attain portability by providing wheeled carriages upon which the unit is supported, whereby it can be moved from window to window in the various areas to be conditioned. Such proposals have at best been makeshift, in that though the unit could be moved by means of the carriage, the movement was limited to one floor, and proper positioning with respect to the window stool required relatively skilled techniques. Additionally even where the carriage is employed, the unit still functions generally only for cooling purposes and other problems arise in connection with the mounting and sealing of the units in operative position.

It is with the above problems in mind that the present invention has been evolved, means permitting a substantial reduction in the size of an air conditioning unit over that previously available for the same cooling capacity, along with means permitting efficient installation and removal of the unit in a window without requiring the services of a skilled mechanic, said installation permitting either or both the heat dissipating condenser and/or the cooling evaporator to be exposed to the conditioned area.

It is accordingly a primary object of this invention to provide an improved air conditioning unit.

Another important object of this invention is to provide a truly portable air conditioner which is sufficiently light in weight so that it may be carried by any adult of normal strength and placed in operative position for use by an average person.

Another object of the present invention is to provide a truly portable air conditioner which can be conveniently moved from one window to another in order to most effectively air condition any area, as desired.

It is still another object of the present invention to provide a truly portable air conditioner which can easily be detached from one window and installed in another window without the use of tools.

A still further object of this invention is to provide a truly portable air conditioner which can provide cooling in hot weather, or heating in cool weather.

A still further object of this invention is to provide novel mounting means for an air conditioning unit which will permit said unit to be readily mounted in operative position without requiring the services of a skilled mechanic.

A still further object of this invention is to provide means permitting an air conditioning unit to be readily employed alternatively as a cooler, heater, or dehumidifier.

Yet another object of this invention is to provide a truly portable air conditioner which can easily be carried to a damp area of a house (such as a cellar) and utilized to produce dehumidification.

It is also an object of this invention to provide improved air distribution means for directing air through an air conditioning unit.

A further object of the invention is to provide mounting means permitting an air conditioner unit to be operatively positioned for either heating, cooling, or dehumidification.

An additional object is to provide improved sealing means.

A further object is to provide sealing means which may be snapped into position.

These, and other objects and attendant advantages of the present invention which will be made hereinafter more apparent are achieved by provision of a novel portable air conditioner unit adapted to be removably mounted for operation in a window or the like wall opening, as well as on a floor. The novel unit comprises a casing, an evaporator chamber and a condenser chamber in said casing, novel air distributing means of progressively reduced cross-section for directing the air in said evaporator chamber whereby the dimensions of the unit may be reduced, means on said casing for aligning said casing in said window, and quick attachment-detachment means mounted on said casing for removably securing the said air conditioner in said window. The aligning means and attachment-detachment means function interchangeably, whereby the portable air conditioner unit may be selectively oriented to provide cooling, heating or dehumidification. Additionally a snap-in type of sealing panel is provided for rapidly and effectively closing off the space between the side of the unit and the window.

Either heating or cooling effects are provided dependent on whether the evaporator chamber is in heat exchange relationship with the air in the conditioned area in which case cooling results; or whether the condenser chamber of the air conditioner communicates with the room to be conditioned, in which case heating results. The interchangeably functioning alignment means and the quick attachment-detachment means on the casing permits the air conditioner to be positioned for cooling or heating with a minimum of effort. Furthermore, the air conditioner of the present invention, with a minor adjustment, may be utilized to provide dehumidification of a damp area.

A primary feature of the invention resides in the provision of a novel casing for an air conditioner, which implements portability, and selective operative installation to cool, heat, or dehumidify.

Another feature of the invention resides in the provision of a novel evaporator fan housing including an air distribution trough of progressively decreasing cross-section for directing air over the evaporator coils of the unit, whereby the unit may be reduced in size.

A further feature of the invention resides in the mounting means comprising: interchangeably functioning aligning and attachment-detachment means permitting the unit to be readily installed and reversed to provide either heating or cooling.

An additional feature of the invention resides in the provision of snap-in sealing means.

The present invention will be more fully pointed out in conjunction with the accompanying drawings, wherein:

Figure 2 is an isometric view of the novel air conditioner with the casing removed;

Figure 3 is an isometric view of the evaporator blower duct assembly;

Figure 4 is a sectional view taken on line IV—IV of Figure 2;

Figure 7 is an oblique view showing one modification of the air conditioner mounted in a window;

Figure 8 is a side elevational view of the air conditioner of Figure 1 mounted in a window; and Figure 9 is a plan view of a modified form of side panel.

Figures 1, 5, 6:
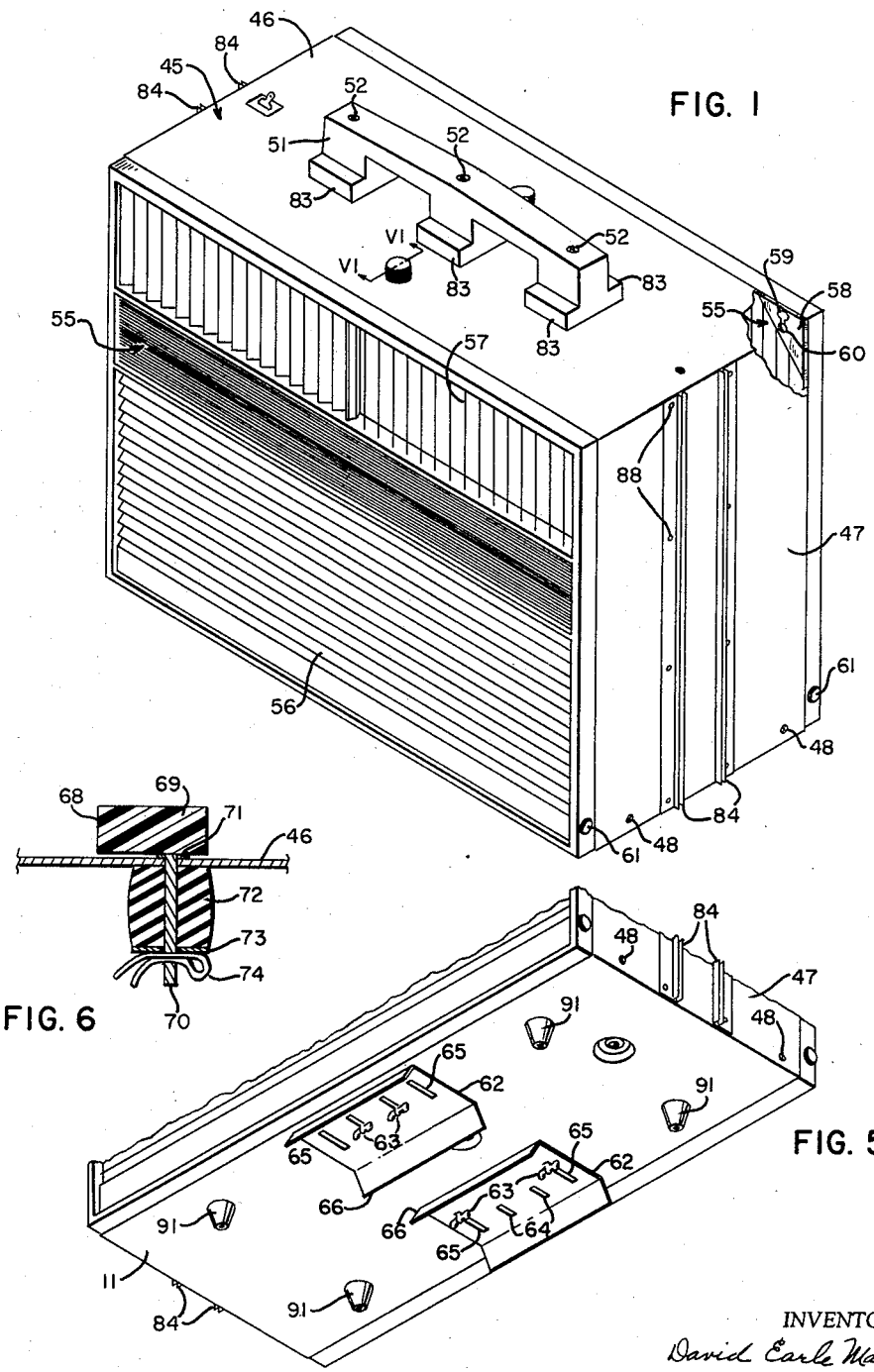
Figure 1 is an isometric view of the air conditioner of the present invention.
Figure 5 is an isometric view of the bottom of the air conditioning unit showing the mounting bracket structure.
Figure 6 is a detail view taken on line VI—VI of Figure 1.

In Figures 1, 2, 3 and 4, the air conditioner of the present invention is shown. A casing base 11 is provided with an upstanding flange 12 about the periphery thereof. Suitably affixed to base 11 is an upstanding partition 13 which as best seen in Figures 2 and 3 is formed with an offset portion 13' which divides the air conditioner into an evaporator chamber 14 and a condenser chamber 15. A fan motor 16 is affixed as by brackets 17 to partition 13. A condenser fan 18 is affixed to one end of the double ended shaft of motor 16 and an evaporator fan 19 is affixed to the other end thereof. It will be observed that the center of gravity of the assembly of fan motor 16 and fans 18, 19 is approximately on a vertical plane through the geometric center of base 11.

A compressor 20 of the flat, pancake type is mounted on the condenser side of partition 13 within offset portion 13'. A plate fin type of evaporator coil 22 having a flange 23 at each end and thereof (only one flange shown) is adapted to be mounted on brackets 24 as by sheet metal screws 25, brackets 24 in turn being affixed to partition 13 as by screws 26.

Evaporator fan 19 (Figure 2) is adapted to rotate within evaporator fan housing 27 (Figures 2, 3 and 4). The fan housing 27 includes a scroll portion 28 having an elongated leg 29 extending therefrom. An upstanding rear wall 30 is provided on both the scroll portion 28 and the leg portion 29. A plurality of apertures 31 are provided in wall 30 to accommodate fastening members such as sheet metal screws (not shown), for fastening the fan housing 27 to partition 13. End plates 32 and 33, having apertured fastening flanges 34 and 35, respectively, serve the function of confining the air flow produced by fan 19 and fastening the fan housing 27 to partition 13, respectively. The leg portion 29 of evaporator fan housing 27 consists of an inclined bottom 36 and a front wall 37 in addition to the foregoing structure. As seen in Figure 3 the space defined by bottom 36, rear wall 30 and front wall 37 is of progressively decreasing cross sectional area the further the distance from fan 19.

The evaporator coil 22 is located above the fan housing 27. In order to prevent leakage between the fan scroll portion 28 and partition 13, a plurality of brackets 38 are affixed thereto, as by welding to accommodate suitable screws for fastening scroll 28 securely to partition 13 in an airtight manner.

A condensate drain pan 39 (Figures 2 and 3) is suitably affixed to brackets 24, as by sheet metal screws (not shown) under evaporator coil 22. A flexible conduit 40, which is attached to one end of pan 39, extends through an aperture 41 in partition 13 permitting condensate from pan 39 to be directed into a pan 42 which is defined by the bottom of base 11, the upstanding base walls 12 and partition 13. A slinger ring 43 is affixed to fan 18 to pick the condensate up from pan 42 and dispose of it in a conventional manner.

A condenser coil 44 (Figure 2) is suitably affixed to partition 13 by brackets (not shown) which are similar to brackets 24 utilized with respect to evaporator coil 22. The refrigerant conduits linking compressor 20, evaporator coil 22 and condenser coil 44 and the conventional expansion means (not shown) have been omitted from the drawing for the sake of clarity since these connections and conduits can be of any type which are conventional in the art. Furthermore, the electrical wiring which links fan motor 16 and the motor of compressor 20 have been likewise omitted since this can consist of any conventional type of arrangement.

Enclosing the structure shown in Figure 2 is a housing 45 as best seen in Figure 1. Housing 45 is preferably formed of one piece of sheet material such as metal, or the like and is shaped with a top 46 having depending sides 47 at each end thereof. Sheet metal screws 48 are adapted to coact with apertures 49 (Figure 2) in upstanding flange 12 base 11 to fasten casing 45 to the structure shown in Figure 2. Other apertures may be provided in flanges 50 of partition 13 to receive sheet metal screws which project through suitable apertures (not shown) in depending side walls 47. A carrying handle 51 is adapted to be secured to the top of the air conditioning unit. Screws 52 which extend through both handle 51 and the casing top 46 are received in apertures 53 in flange 54, which is formed on partition 13 as seen in Figure 2.

Identical grilles 55 (only one shown) are provided on the front and rear of the unit. Each grille 55 is provided with plurality of horizontal louvers 56 at the lower part thereof and a plurality of vertical louvers 57 at the top part thereof. These grilles 55 may be removably secured to the casing 45 by means of gussets 58, as seen in the cutaway on Figure 1. These gussets 58 are provided at the four upper corners between top wall 46 and side wall 47 of the casing 45. A keyhole slot 59 in gusset 58 is adapted to coact with an enlarged head 60 of a bolt, or the like, which is attached to the rear of the grille 55. Similar connections are provided at the bottom portions of casing 45. The foregoing construction permits either one of the grilles to be lifted upwardly and then out to detach it from the unit as desired. It will be appreciated that any other type of mechanical connection which permits removal of the grilles may be used. Knurled knob screws 61 are provided at the sides of the grilles, near the bottom to engage casing 45 and secure the grilles in position.

Ease of installation of the air conditioner in operative position is attained by the use of positive alignment means in conjunction with quick attachment-detachment means. More specifically, in Figures 5 and 8 brackets 62 are shown attached to base 11 of the air conditioner by means of wing bolts 63. Brackets 62 are identical and contain two pairs of slots 64 and 65. Each bracket has a flanged portion 66 which is adapted to abut window stool 67 when the air conditioner is in its mounted position.

Additional means are provided for securing the air conditioner in the window in a positive and efficient manner as illustrated in Figures 1, 6, 7, and 8. Locking knobs 68 are mounted on the top wall 46 of casing 45. As shown in Figure 6, knob 68 includes a head portion 69 which is eccentrically mounted on shaft 70, the latter projecting through a suitable aperture in top wall 46. Interposed between head 69 and wall 46 is a bearing washer 71. A rubber or plastic washer 72 is mounted on shaft 70 so that it is in compression and therefore bears against the under surface of top wall 46. A washer 73 and cotter pin 74 both mounted on shaft 70 cause washer 72 to be in compression.

A modified type of mounting is shown in Figure 7. In addition to the above described mounting structure, a U-bracket 77 is suitably secured to the top wall 46 of casing 45. U-bracket 77 has two upstanding legs 78 and 79. When alignment bracket 62 is in the position shown on Figure 7 so that it abuts the rear of window stool 67, leg 79 of bracket 77 lies in the same plane as the leading edge of bracket 62, this plane also including the face 80 of window sash rail 76 and the surface 81 of window track 82.

A pair of tracks 84 is mounted on each side 47 of the casing for accommodating side or wing sealing panels 85 (Figure 7). As can be seen from Figure 7, the tracks are fabricated from angles 86 and 87, the latter being superimposed on the former. Fastening members such as sheet metal screws 88 fasten the angles to the side wall of the unit. The upstanding legs 89 and 90 of angles 86 and 87, respectively, provide a track for receiving side panels 85 which are held in the tracks by a pressure fit. It is readily appreciated that tracks 84 may be of any other suitably formed material such as extended plastic, etc.

In Figure 9, a modified form of snap-in side panel is shown. Panel 85 fits into track 84, as described above relative to panel 85. A flexible flap 90, which is made of rubber or plastic, has a forked portion which is adapted to fit over the edge of panel 85, as shown. The end of flap 90 which is remote from the forked portion is adapted to rest against surface 81 of window track 82. The flexibility of flap 90 permits side panel 85 to be inserted with a minimum of manual manipulation. Furthermore, this construction permits the placing of panels 85 in position either before or after the unit is mounted in the window.

The afore-disclosed structural components assembled within housing 45 provide a unit air conditioner which may readily be moved. The unit is characterized by its relatively light weight, small size, and its facility of in-pounds and is 11 inches deep, 16½ inches high, and 22 inches wide. Aside from the obvious ease of portability, the facility of installation provided produces a flexibility of use heretofore unattainable whereby a single unit may be operatively positioned in a wide variety of areas and may be selectively employed for either heating, cooling, or dehumidifying the air in a conditioned area.

In use, the unit is mounted in the conditioned area by employing the quick attachment-detachment means best illustrated in Figures 5 and 8. Where the unit is to be employed for cooling the air in a conditioned area, it is contemplated that the unit will be mounted on a window stool with the cooling evaporator coil 22 facing inwardly into heat exchange relationship with the air in the conditioned area. This is accomplished by mounting the unit on the window stool with the grille 55 over evaporator chamber 14, facing into the conditioned area. In order to so mount the unit, bracket 62 which is most remote from this particular grille is moved away from the grille until the slots associated with wing bolts 63 abut the end portion of the slot through which the bolts project. Bolts 63 are then tightened in this position to permit this bracket 62 to function as aligning means. The unit is then lifted by means of handle 51 and placed on the window stool as seen in Figure 7, with the flange 66 abutting the rear of the window stool 67, at which time the other bracket 62 which is closest to the grille functioning as attachment means is moved to the position shown in Figure 8 where the flange 66 thereof abuts against the front of stool 67. In this position, the wing bolts 63 of this interior bracket functioning as attachment means are tightened so that the stool 67 is securely clamped. As seen in Figure 8, flanges 66 have sharp edges which dig into the vertical rear surface of the conventional stool, while the flange 66 on the interior bracket engages beneath the surface of the interior portion of the stool. With the unit so positioned, its center of gravity is located on a vertical plane through the window stool 67.

After the unit is positioned with its brackets 62 in the above-described manner, the window 76 is lowered so that its lower sash rail 76 rests on the top 46 of casing 45. It is then observed whether knob 68 abuts the rear of sash rail 76. If it does not, the window is opened and knob 68 is rotated manually to a position where it will securely abut the rear of window sash rail 76 as shown in Figure 8. Thus, an additional point of contact is provided to securely hold the air conditioner in the window. Because of its friction type of mounting, knob 68 will remain in any position in which it is manually placed.

In the installation shown in Figure 7, the U-bracket 77 may be employed if it is desired to implement engagement of window sash rail 76. In this installation brackets 62 are manipulated in the above described manner. When the window is closed so that it rests on the top of the unit, leg 79 will abut the surface 80 of sash rail 76. The knob 68 is then manipulated as described above. It can thus be seen that the unit is firmly held in position in the window by brackets 62, bracket 77 and knob 68. It will readily be appreciated that the carrying handle 51, Figure 1, may have the base portion thereof extended as at 83 so that the handle 51 serves the function of bracket 77.

Thereafter, sealing panels 85 are inserted in the tracks 84 secured to the side walls of housing 45. These sealing panels may be provided in a variety of sizes, however, for general home use, where all windows are of uniform dimension, a single set of panels will suffice. These panels are of a dimension sufficient to extend between tracks 84 and window track 82 as best seen in Figure 7.

Alternatively, the modified form of sealing panel including flap 90 as illustrated in Figure 9 may be employed whereby the panels 85 may be placed in a position either before or after the unit is mounted in the window since the free end of flap 90 may readily be snapped into the window track 82. Once installed for cooling operation, the switch here illustrated in Figure 1 at the top left of casing 45 is thrown to start the motor of compressor 20 and fan motor 16. An air stream is set up through grilles 56 and is circulated from the conditioned area by means of squirrel cage fan 19 through instake grilles 56 into evaporator chamber 14 up through fan housing 27 along leg portion 29 of progressively decreasing cross-sectional area. It will be observed that this decreasing cross-sectional area causes a relatively constant volume of air to be discharged through all portions of evaporator coil 22 providing for maximum heat exchange between the evaporator and the air stream set by fan 19. After passage through the evaporator coil, the air stream which has been cooled by contact with the relatively cold evaporator coil surface is discharged through vertical louvers 57 to the conditioned area. Simultaneously with the initiation of the air stream over the evaporator coil, condenser fan 18 will set up circulation of an outside air stream which will flow through condenser chamber 15 to dissipate the heat produced by the heat dissipating condenser, to the outside air. Any condensate collecting in the evaporator chamber 14 drains downwardly in drain pan 39 beneath evaporator 22 to flexible conduit 40 which delivers the condensate through aperture 41 to condenser chamber 15 where it is picked up by slinger ring 43.

Since the unit is readily portable, it may obviously be moved to a variety of areas for installation as above described to provide for the cooling of these areas. Since the mounting brackets 62 are symmetrically positioned on the base 11 of the unit, the unit may obviously be oriented with either of its facade grilles 55 facing the conditioned areas, whereby either the heat dissipating condenser chamber 15 or the cooling evaporator chamber 14 may readily be placed into heat exchange relationship with the air on the conditioned area, thus serving to provide for either heating or cooling, dependent on the orientation of the unit.

When it is desired to employ the unit for heating purposes, mounting brackets 62 are employed as previously described to secure the unit on a window stool. However, the condenser chamber is turned inwardly towards the conditioned area. Brackets 62 are adjusted by means of wing bolts 63 to align the unit and grip the window stool; window sash rails 76 is lowered to the top of casing 45; knob 68 is abutted against the rear of the sash rail, and sealing panels 85 positioned to close off the space between the side of the unit and the window frame.

Upon initiation of operation of the unit, after coupling to an appropriate source of electrical energy, an air stream is circulated by condenser fan 18 between the conditioned area and the condenser chamber 15 whereby the air stream will be warmed after passing into heat exchange relationship with the condenser.

The portability of the unit further permits utilization thereof solely for dehumidification purposes. In such use, mounting brackets 62 may either be removed from base 11, or they may be adjusted to their maximum outward position, to serve as legs for the base in combination with legs 91. Thereafter, the unit is positioned with both the condenser chamber 15 and the evaporator chamber 14 in heat exchange relationship with the conditioned area. This is most readily accomplished by setting the unit on the floor within the conditioned area. It is desirable in this use to extend flexible condensate discharge conduit 40 through the horizontal louvers 56 of the grille 55 positioned over the evaporator chamber 14. A suitable condensate collector should be employed such as a pan or the like. A portion of the air from a conditioned area passes into heat exchange relationship with the heat dissipating condenser which raises the temperature of the air and correspondingly decreases the relative humidity thereof. Another portion of the air is drawn into heat exchange relationship with the cooling evaporator coil which causes condensation of moisture from the air to reduce the absolute humidity thereof. This condensate drains through tube 40. The combined air which has passed through the unit will thus have a possibly higher temperature but a reduced absolute and relative humidity.

It is thus seen that a novel air conditioner unit has been provided, having a novel casing including a novel evaporator fan housing. The casing is provided with a novel mounting means and sealing means whereby the unit may readily be moved from area to area and may be operatively positioned in these areas to provide either heating, cooling, or dehumidification, as desired.

The above disclosure has been given by way of illustration and elucidation, and not by way of limitation, and it is desired to protect all embodiments of the herein disclosed inventive concept within the scope of the appended claims.

I claim:

1. A portable air conditioner constructed and arranged to be reversibly mounted in a window for selectively providing cooling or heating to an enclosure comprising a casing; an evaporator chamber and a condenser chamber in said casing; first positive alignment means on said casing for aligning said air conditioner in said window with said evaporator chamber communicating with said enclosure; first quick attachment-detachment means adapted to cooperate with said first positive alignment means to removably secure said casing in said window; second positive alignment means on said casing for aligning said air conditioner in said window with said condenser chamber communicating with said enclosure; and second quick attachment-detachment means adapted to cooperate with said second positive alignment means to removably secure said casing in said window; whereby said air conditioner selectively provides cooling or heating when said evaporator chamber or said condenser chamber is in communication with said enclosure, respectively.

2. A portable air conditioner as set forth in claim 1 wherein said first positive alignment means utilized during cooling functions as said second quick attachment-detachment means during heating and wherein said second quick attachment-detachment means utilized during heating functions as said first positive alignment means during cooling.

3. A portable air conditioner as set forth in claim 1 wherein said first positive alignment means includes a first member adapted to abut the front of a window sash rail and wherein said first quick attachment-detachment means includes a first adjustable member adapted to abut the rear of said window sash rail to coact with said first member to clamp said window sash rail therebetween.

4. A portable air conditioner as set forth in claim 3 wherein said second positive alignment means includes a second member adapted to abut the front of a window sash rail and wherein said second quick attachment-detachment means includes a second adjustable member adapted to abut the rear of said window sash rail to coact with said second member to clamp said window sash rail therebetween.

5. A portable air conditioner as set forth in claim 1 wherein said first positive alignment means includes a first bracket mounted on said casing adapted to abut the rear of a window stool and wherein said first quick attachment-detachment means includes a first movable member adapted to abut the front of said window stool and coact with said first bracket to clamp said window stool therebetween.

6. A portable air conditioner as set forth in claim 5 wherein said second positive alignment means includes a second bracket mounted on said casing adapted to abut the rear of a window stool and wherein said second quick attachment-detachment means includes a second movable member adapted to abut the front of said window stool and coact with said second bracket to clamp said second window stool therebetween.

7. A portable air conditioner having a casing constructed and arranged to be reversibly mounted in a window with either the condenser chamber or the evaporator chamber thereof communicating with an area to be conditioned comprising alignment means connected to said casing and adapted to abut the rear surface of a window stool, fastening means connected to said casing and adapted to coact with said alignment means to clamp a window stool therebetween, a side panel, and means on the side of said casing for mounting said side panel so that the portion of said alignment means which abuts said window stool and the point of connection between said side panel and casing lie in substantially the same plane.

8. A mounting structure for a portable air conditioner constructed and arranged to be reversibly mounted in a window to selectively provide heating or cooling to an enclosure comprising a casing, a partition within said casing forming an evaporator chamber and a condenser chamber in said casing, a first bracket mounted on said casing for abutting the rear of a window stool when said evaporator chamber is in communication with said enclosure, a second bracket mounted on said casing adapted to coact with said first bracket to clamp said window stool therebetween, said brackets being adjustable with respect to one another, said second bracket abutting the rear of said window stool and said first bracket coacting with said second bracket to clamp said window stool therebetween when said condenser chamber is in communication with said enclosure, and means on the top of said casing for engaging the window sash rail.

9. A portable air conditioner as in claim 1 including means on said casing for mounting a side panel when the air conditioner is either in cooling or heating position.

10. A portable air conditioner constructed and arranged to be reversibly mounted in a window for selectively providing cooling or heating to an enclosure comprising, a casing having a top and a bottom; a partition in said casing forming an evaporator chamber and a condenser chamber therein; a first bracket adjustably mounted on said bottom; a second bracket adjustably mounted on said bottom, said brackets adapted to cooperate with one another to removably secure said bottom in said window; a first member mounted on said top; a second member mounted on said top, and an abutment means mounted between said members; said first and second members adapted to alternatively coact with said abutment means to removably secure said top in said window, said first and second brackets functioning interchangeably to mount the casing in the window with either the evaporator chamber or condenser chamber facing the enclosure.

11. A portable air conditioner as set forth in claim 10 wherein said first and second brackets each have slots therein and means extend through said slots to adjustably connect said brackets to the bottom of said casing.

12. A portable air conditioner as set forth in claim 10 wherein said first and second members are each comprised of an eccentrically mounted knob.

13. A portable air conditioner constructed and arranged to be reversibly mounted in a window for selectively providing cooling or heating to an enclosure comprising, a casing having a top and bottom; a partition in said casing forming an evaporator chamber and a condenser chamber therein; a first bracket adjustably mounted on said bottom; a second bracket adjustably mounted on said bottom adapted to cooperate with said first bracket to secure said bottom in said window; an abutment means on said top adapted to abut one side of a window sash rail; a first member adjustably mounted on said top adapted to abut the other side of said window sash rail and to coact with said abutment means to clamp said window sash rail therebetween when the evaporator chamber communicates with said enclosure; and a second member adjustably mounted on said top adapted to abut said other side of said window sash rail and to coact with said abutment means to clamp said window sash rail therebetween when the condenser chamber communicates with said enclosure; said first and second brackets, respectively, functioning interchangeably and said first and second members cooperating alternatively with said abutment means to accommodate reversing the air conditioner in the window.

14. A portable air conditioner constructed and arranged to be reversibly mounted in a window for selectively providing heating or cooling in an enclosure comprising a casing, partition secured within said casing to form a condenser chamber and an evaporator chamber in said casing, alignment means on said casing for positioning said casing in said window for either heating or cooling, said alignment means including a first member adapted to abut the rear of the window stool when said evaporator chamber is in communication with said enclosure, a second member adapted to abut the rear of the window stool when said condenser chamber is in communication with said enclosure, a third member adapted to abut the front of said window sash rail when said evaporator chamber is in communication with said enclosure and a fourth member adapted to abut the front of said window sash rail when said condenser chamber is in communication with said enclosure.

References Cited in the file of this patent

UNITED STATES PATENTS

| | | |
|---|---|---|
| 2,316,704 | Moore | Apr. 13, 1943 |
| 2,335,627 | Wolfert | Nov. 30, 1943 |
| 2,498,661 | Dybvig | Feb. 28, 1950 |
| 2,628,052 | Cira | Feb. 10, 1953 |

UNITED STATES PATENT OFFICE
CERTIFICATE OF CORRECTION

Patent No. 2,945,357                               July 19, 1960

David Earle MacLeod

It is hereby certified that error appears in the printed specification of the above numbered patent requiring correction and that the said Letters Patent should read as corrected below.

Column 5, line 51, for "in-" read -- installation. --; column 5, line 52, before "pounds" insert -- The complete unit weighs approximately 60 --; column 6, line 61, for "instake" read -- intake --; line 67, after "set" insert -- up --.

Signed and sealed this 25th day of April 1961.

(SEAL)

Attest:

ERNEST W. SWIDER
Attesting Officer

DAVID L. LADD
Commissioner of Patents